INVENTOR
THOMAS E. PYNOR
By Leon Edelson
ATTORNEY

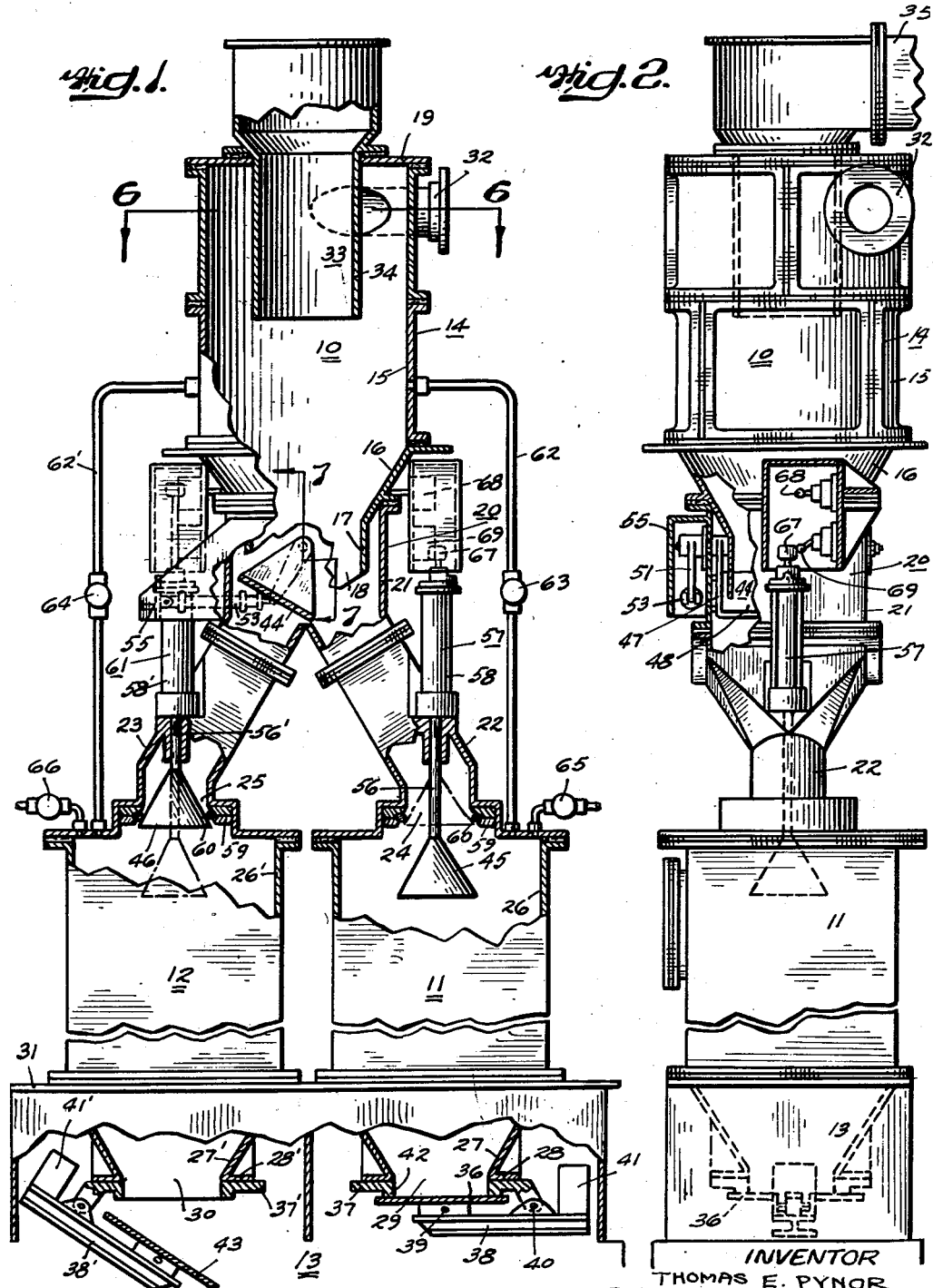

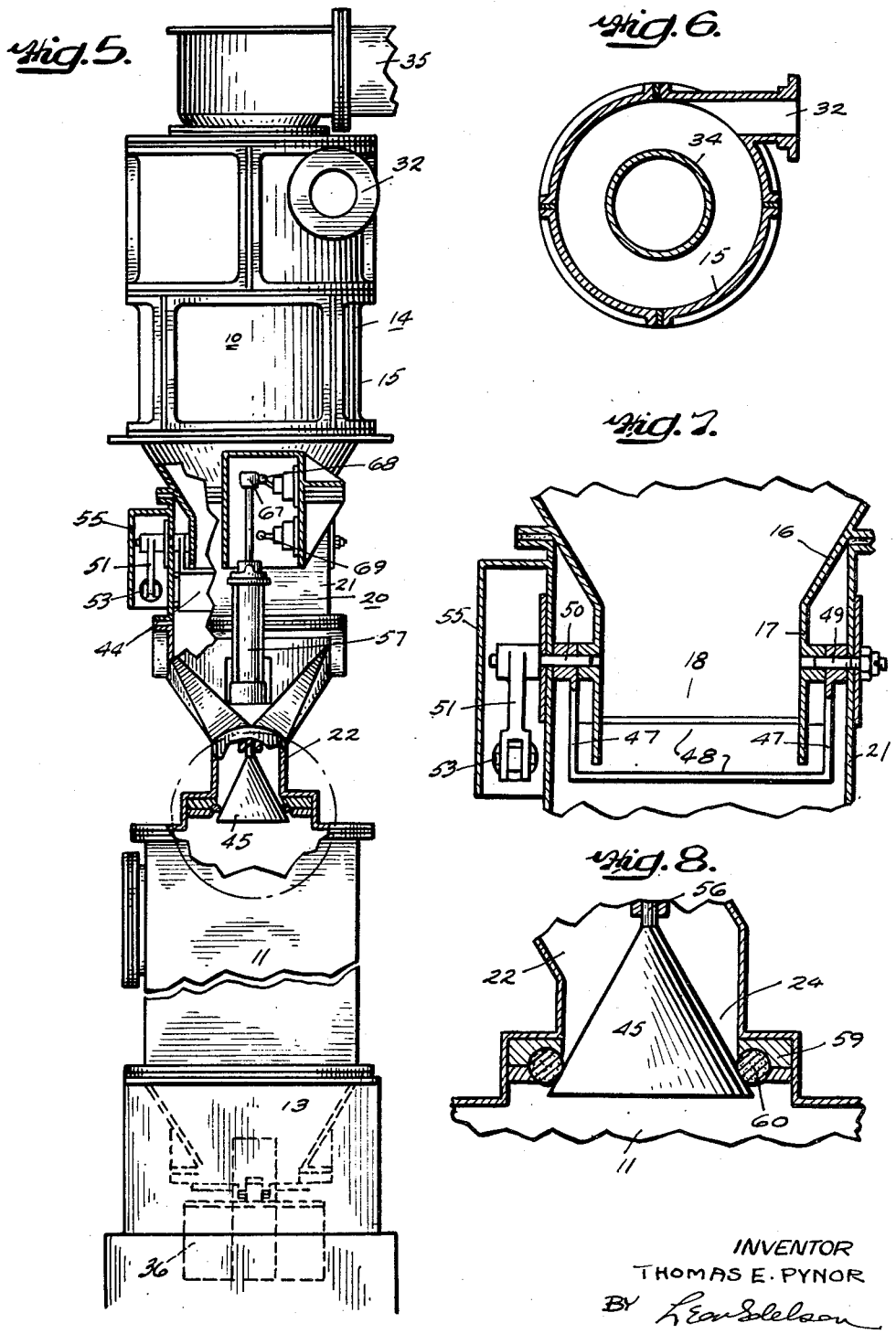

United States Patent Office 2,804,170
Patented Aug. 27, 1957

2,804,170

AUTOMATIC CONTINUOUS DISCHARGE AIR LOCK FOR CYCLONE SEPARATOR

Thomas E. Pynor, Port Kennedy, Pa., assignor to Beaumont Birch Company, Philadelphia, Pa., a corporation of Pennsylvania Application February 3, 1954, Serial No. 407,866

5 Claims. (Cl. 183—85)

This invention relates generally to apparatus for centrifugally separating solid material from a conveyor fluid and collecting the same, being more particularly concerned with an improved construction of the pneumatic type of such apparatus.

A principal object of the present invention is to provide such apparatus with valve and discharge gate means operable in accordance with a predetermined sequence and time cycle which affords continuous operation of the apparatus.

Another object of the present invention is to provide such an apparatus operable as aforementioned wherein there is a continuous gravity flow of material to the level of discharge from the apparatus.

Still another object of the present invention is to provide such a continuous flow apparatus wherein the collector is provided with a dual discharge passage the sections of which communicate respectively with different receiver sections which are continuously alternately loaded and intermittently alternately unloaded.

A further object of the present invention is to valve such a collector discharge passage for diversion of the flow of material at the entrance end of the discharge passage alternately from one passage section to the other and for hermetically sealing by delayed action the discharge end of the passage section from which the flow of material is diverted.

Other objects and advantages of the present invention will appear more fully hereinafter, it being understood that the invention consists substantially in the combination, construction, location and general arrangement of parts, all as described in detail in the following specification, as shown in the accompanying drawings and as fully pointed out in the appended claims.

In the accompanying drawings:

Figure 1 is a vertical section through an apparatus embodying the present invention, the apparatus being shown in the condition thereof while loading on the right hand side and unloading on the left hand side;

Figure 2 is a side elevation of the apparatus as shown in Figure 1;

Figure 5 is a side elevation of the apparatus as shown in Figure 4;

Figure 6 is a horizontal section taken on line 6—6 of Figure 1;

Figure 7 is a section on line 7—7 of Figure 1; and

Figure 8 is an enlarged view of the area encircled in Figure 5.

Figure 3:
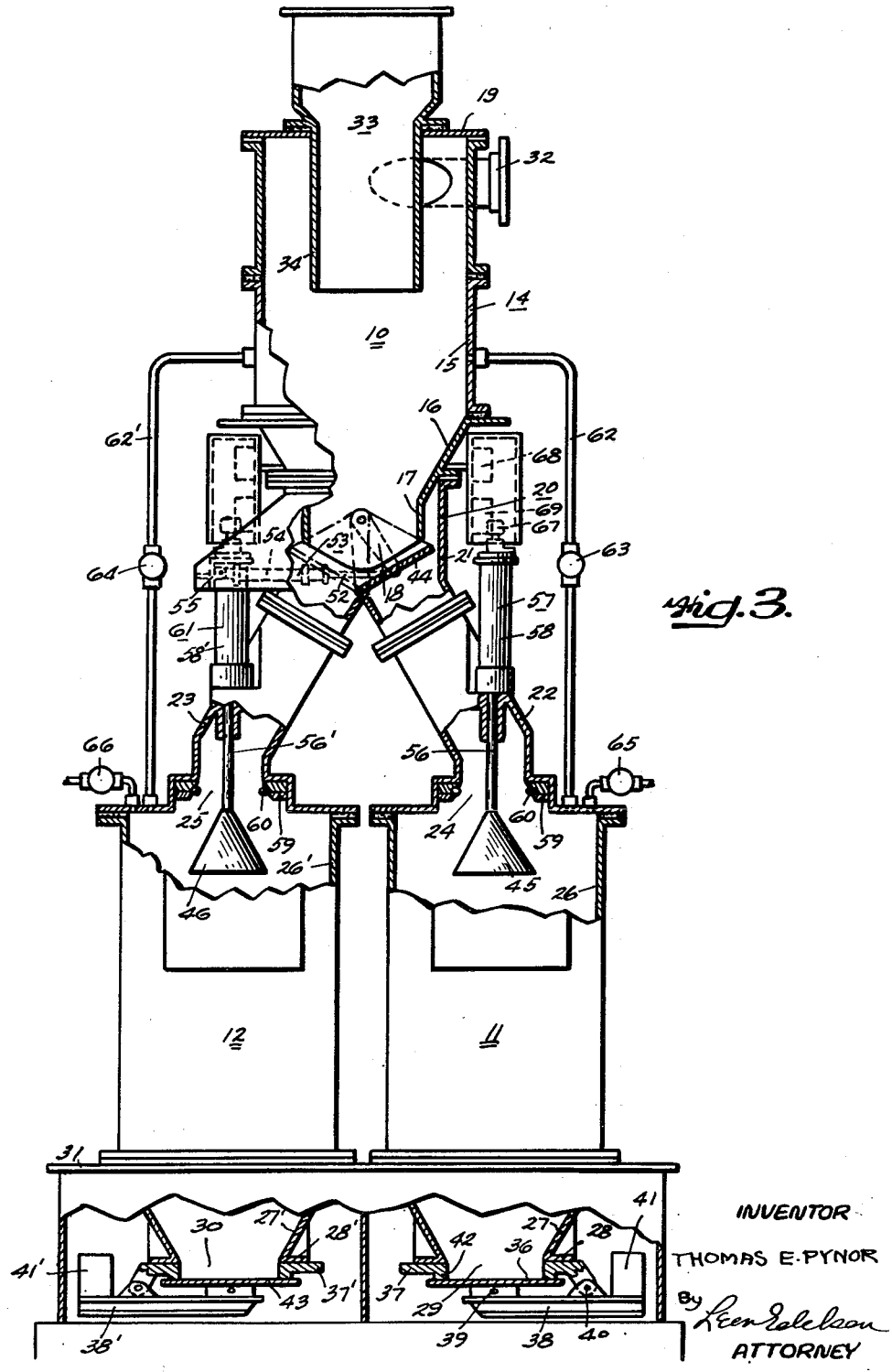
Figure 3 is similar to Figure 1, but the apparatus is shown in an intermediate condition.

Referring to the drawings, the apparatus of the present invention comprises a separator 10 disposed directly over a pair of receivers 11 and 12 which are mounted over a storage bin 13.

The separator 10 is provided with a top section 14 having a cylindrically shaped upper wall portion 15, a conically shaped intermediate wall portion 16 and a cylindrically shaped lower wall portion 17, the latter being provided with a central opening 18 of reduced diameter. The top section 14 is covered by a plate 19 and is seated upon a discharge section 20, the latter being provided with a rectangularly shaped upper wall portion 21 into which there projects freely the lower wall portion 17 of the top section 14, and being provided further with a lower wall portion in the form of a pair of suitably shaped chutes 22 and 23 which diverge downwardly and which are provided with cylindrically shaped terminal portions having respectively central openings 24 and 25.

The receiver 11 is provided with a rectangular shaped upper wall portion 26 and a downwardly converging lower wall portion 27 which terminates in an external flange 28 having a central opening 29. In all material respects, the receiver 12 is similar to the receiver 11, being provided with an upper wall portion 26', a lower wall portion 27' and a flange 28' having a central opening 30. The receivers 11 and 12 have seated thereon respectively the chutes 24 and 25 of the separator discharge section 20, and the lower wall portions 27 and 27' respectively of the receivers 11 and 12 project into the storage bin 13 through a cover plate 31 over the storage bin 13. It will be understood that the component parts of the apparatus so far described are suitably flanged and otherwise conventionally secured together.

For passing through the separator 10 the fluid medium which conveys the solid material, the separator 10 is conventionally provided with a tangentially disposed inlet nozzle 32 and an outlet duct 33, the latter being provided with a section 34 which extends vertically through the separator cover plate 19 and with a laterally extending section 35 which communicates with an exhauster (not shown).

The solid material separated from the fluid medium is collected by the apparatus for discharge through the openings 29 and 30 respectively in the bottoms of the receivers 11 and 12. For controlling the opening 29, the receiver 11 is provided with a discharge gate including a gate plate 36 which is carried by a frame 37 through the medium of an arm 38. The gate plate 36 is pivotally secured at 39 to the arm 38, and the latter is pivotally secured at 40 to the frame 37. For biasing the gate plate 36 toward the closed position thereof, the arm 38 is suitably weighted at 41; and for effectively sealing the opening 29, the frame 37 is provided with a collar in the form of a suitably raised bead 42 which extends about the opening 29 for contact with the gate plate 36. For controlling the opening 30, the receiver 12 is provided with a discharge gate which is identical to the discharge gate just described for the receiver 11, being provided with a gate 43 and a frame 37', arm 38' and a weight 41'.

The discharge section 20 of the separator 10 affords a dual discharge passage the sections 22 and 23 of which communicate respectively with the receivers 11 and 12. For controlling this passage, the apparatus is provided with valve means comprising a flow diversion member in the form of a gate 44 and a pair of closure members in the form of bells 45 and 46 at the discharge end of the passage, the bells being associated respectively with the chutes 22 and 23.

Referring particularly to Figures 1 and 7, the diversion gate 44 is in the form of a U-shaped member disposed inside the rectangularly shaped upper wall portion 21 of the separator discharge section 20 and in underslung relation to the cylindrically shaped lower wall portion 17 of the separator to section 14, the legs 47—47 of the U-shaped member being positioned between the wall portions 17 and 21, and the section 48 of the U-shaped member being positioned across the central opening 18 of the wall portion 17. The diversion gate 44 is carried by a pair of pivot pins 49 and 50 which are projected through and fixedly secured to its legs 47—47 and journalled in the wall portions 17 and 21. The pin 50 is additionally projected through and fixedly secured to one end portion of a depending arm 51. For actuating the diversion gate, the opposite end portion of the arm 51 is pivotally secured to the piston 52 of a horizontally extending fluid pressure motor 53 which has a cylinder 54 pivotally secured to a bracket 55 extending from the wall section 21 of the separator discharge section 20.

Referring particularly to Figures 1 and 2, the bell 45 is a conically shaped member mounted on the piston 56 of a fluid pressure motor 57 which has a cylinder 58. The latter is seated upon the chute 22 in an upright position with the piston 56 projecting through the wall of the chute and extending downwardly through the chute opening 24, the bell 45 being thereby suspended in the receiver 11 in coaxial relation to the chute opening 24. An annular member 59 extends about the latter and suitably holds a gasket 60 made of rubber or other compressible material against which the bell 45 may be seated to hermetically seal the separator 10 from the receiver 11.

Referring particularly to Figure 1, the bell 46 is carried by a fluid pressure motor 61, the bell 46 and the motor 61 being identical respectively to the bell 45 and motor 57. The cylinder 58' is seated upon the chute 23 in an upright position with the piston 56' projecting through the wall of the chute and extending downwardly into the chute opening 25, the bell 46 being thereby suspended in coaxial relation to the chute opening 25. Another annular member 59 and gasket 60 extend about the latter, and the bell 46 is seated against the gasket and hermetically seals the separator 10 from the receiver 12.

Means are provided for equalizing pressures to facilitate movement of the discharge gates 36 and 43 and the bells 45 and 46, the aforementioned means comprising a conduit 62 extending from the separator 10 to the receiver 11 and valved as at 63 and a similar conduit 62' extending from the separator 10 to the receiver 12 and valved as at 64, a valve 65 in an atmospheric vent which is suitably carried by the receiver 11 and a similar valve 66 in an atmospheric vent which is suitably carried by the receiver 12.

In the operation of the apparatus, the exhauster operates continuously, as a consequence of which the conveyor fluid (for example, air) is continuously drawn into the separator top section 14 through the nozzle 32 and discharged through the duct 33. The solid material (for example, ash) which is initially entrained in the air is centrifugally separated from its conveying stream of air by cyclonic action of the latter in the separator top section 14, dropping by the force of gravity through the opening 18.

In the condition of the apparatus shown in Figure 1, the receiver 11 is being loaded and the receiver 12 is being unloaded. The diversion gate 44, bells 45 and 46 and discharge gates 36 and 43 are in the full line positions shown, the valves 63 and 66 are open and the valves 64 and 65 are closed, as a consequence of which the separator 10 is hermetically sealed from the receiver 12 and the pressures prevailing within the separator 10 and receiver 11 are uniform and subatmospheric. The solid material which drops through the opening 18 is diverted by the gate 44 into the chute 22. It passes through the latter and then drops through the opening 24 into the receiver 11, where it spills over the bell 45 and drops to the bottom of the receiver 11, collecting over the closed discharge gate 36.

Figure 4:
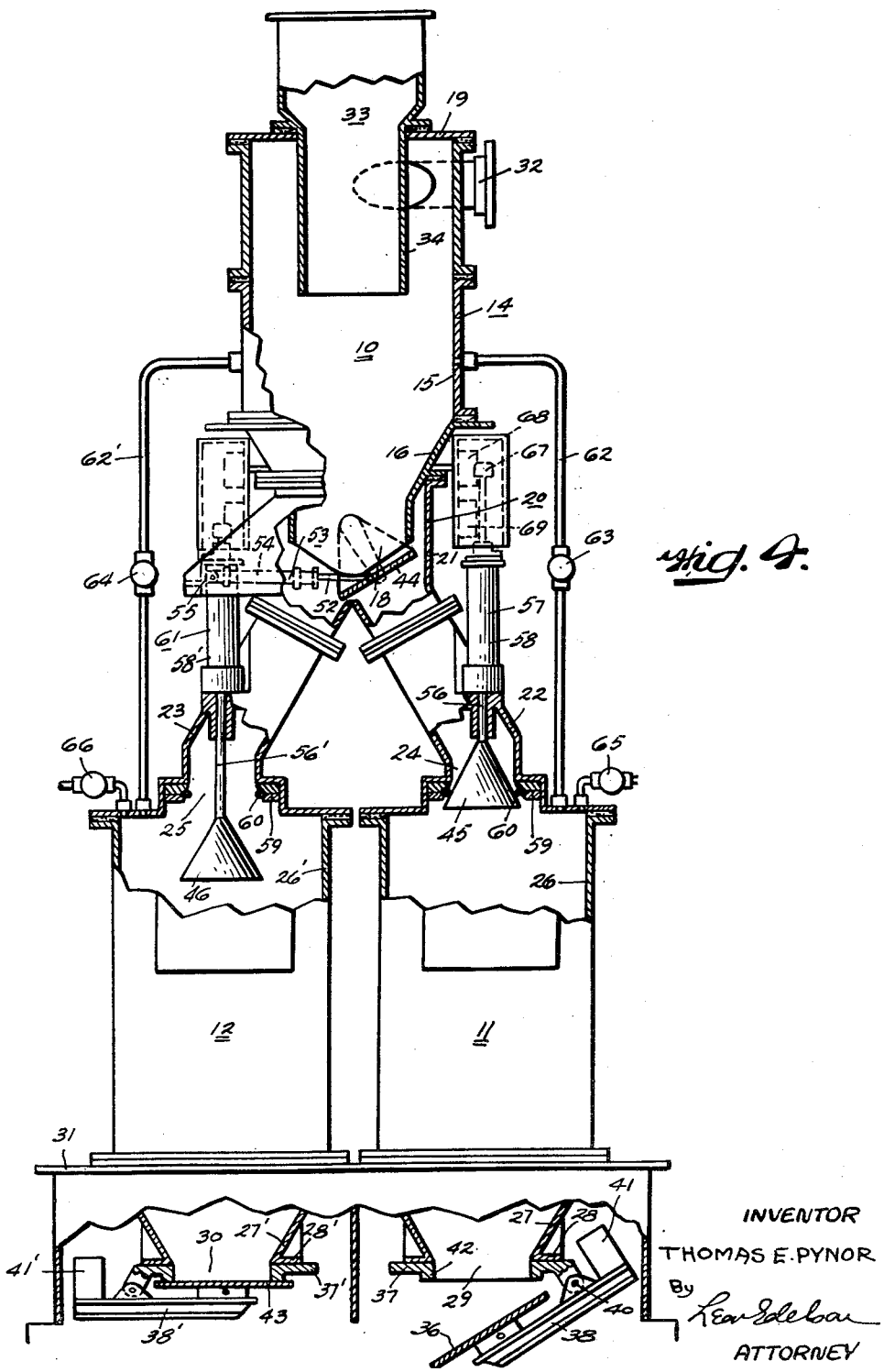
Figure 4 is similar to Figures 1 and 3, but the apparatus is shown in the condition thereof while unloading on the right hand side and loading on the left hand side.

In the condition of the apparatus shown in Figure 4, the receiver 12 is being loaded and the receiver 11 is being unloaded. The diversion gate 44, bells 45 and 46 and discharge gates 36 and 43 are in the full line positions shown, the valves 63 and 66 are closed and the valves 64 and 65 are open, as a consequence of which the separator 10 is hermetically sealed from the receiver 11 and the pressure previously within the separator 10 and the receiver 12 are uniform and subatmospheric. The solid material which drops through the opening 18 is diverted by the gate 44 into the chute 23. It passes through the latter and then drops through the opening 25 into the receiver 12, where it spills over the bell 46 and drops to the bottom of the receiver 12, collecting over the closed discharge gate 43.

The condition of the apparatus alternates between that shown in Figure 1, wherein the receiver 11 is being loaded and receiver 12 is being unloaded, and that shown in Figure 4, wherein the receiver 12 is being loaded and the receiver 11 is being unloaded. While changing from one condition to the other, i. e., while the diversion gate 44 is in motion, the apparatus passes through an intermediate condition shown in Figure 3, wherein the bells 45 and 46 and the valves 63 and 64 are open, and the discharge gates 36 and 43 and the valves 65 and 66 are closed. In the intermediate condition of the apparatus, the separator 10 and receivers 11 and 12 are hermetically sealed from atmosphere, and the pressures prevailing throughout the interior of the apparatus are uniform and subatmospheric.

The apparatus includes means (not shown) for electrically controlling the fluid pressure motors 53, 57 and 61, and the valves 63, 64, 65 and 66, as a consequence of which the valve means including diversion gate 44 and bells 45 and 46, and discharge gates 36 and 43 operate in accordance with a predetermined sequence and time cycle. It will be assumed that the initial condition of the apparatus is that shown in Figure 1, and the steps in the operation of the apparatus which lead to the condition thereof shown in Figure 4 will be set forth, it being understood that the same are reversed during operation of the apparatus for returning the same to its initial condition.

In Figure 1, a load has just dropped through the opening 30 in the receiver 12 into the storage bin 13. Immediately, the discharge gate 43, under the influence of the weight 41', swings to its closed position. At the same time, the valve 66 closes and the valve 64 opens, whereupon the pressures in the separator 10 and receiver 12 are equalized to facilitate subsequent movement of the bell 46. The piston 56' of the fluid pressure motor 61 is then extended and the bell 46 moves downwardly to its open position. Now the piston 52 of the fluid pressure motor 53 is extended, whereupon the diversion gate 44 swings from its position blocking the chute 23 to its position blocking the chute 22. At this stage of the operation the apparatus is in its intermediate condition shown in Figure 3. Now the piston 56 is retracted and the bell 45 moves upwardly to its closed position. Then the valve 63 closes, whereupon the separator 10 is hermetically sealed from the receiver 11. At the same time, the valve 65 opens, as a consequence of which the pressures inside and outside of the receiver 11 are equalized to facilitate movement of the discharge gate 36, which, under the influence of the weight of material collected in the receiver 11, immediately swings open to unload the receiver 11.

With regard to the time cycle in accordance with which the apparatus operates, a single repeating phase may, for example, be assumed to span a period of 120 seconds, during the first 60 seconds of which period the diversion gate 44 blocks the chute 23, and during the second 60 seconds of which the gate blocks the chute 22. In this event, the bells 45 and 46 may be open for 70 seconds and then closed for 50 seconds, both being open at the beginning of the period and closing 65 seconds and five seconds respectively after the period begins. In addition, the valves 65 and 66 and the discharge gates 36 and 43 may be open for 40 seconds and then closed for 80 seconds, all being closed at the beginning of the period, the valve 65 and discharge gate 36 opening 70 seconds and the valve 66 and discharge gate 43 opening ten seconds after the beginning of the period. During the same time, the valves 63 and 64 may be closed for 40 seconds and then open for 80 seconds, both being open at the beginning of the period and closing 70 seconds and ten seconds respectively after the beginning of the period.

It will be observed that as a consequence of the aforementioned sequence of operation and time cycle, there is a time delay of five seconds between the blocking of chute 22 by the diversion gate 44 and closing of bell 45, and that there is a similar time delay between the blocking of chute 23 and the closing of bell 46. The purpose of this time delay is to provide a period of time after the flow of ash has been diverted from one chute to the other during which any ash in the chute which has just been blocked may clear the same so that none will lodge between the bell and the gasket 60 to prevent hermetic sealing at the discharge end of the chute when the bell is closed. In addition, the bell 45 opens five seconds in advance of the opening of chute 22, and the bell 46 opens similarly in advance of the opening of chute 23. The purpose of this advance timing is to provide for discharge into the receiver means, preliminarily to opening of a chute for the flow of material therethrough, of any material which may have collected over the associated bell while the same was closed. In this connection, it will be observed that there is a continuous gravity flow of material to the bottom of the receivers 11 and 12, the receivers 11 and 12 being continuously alternately loaded, and being intermittently alternately unloaded, each during an intermediate concurrent period of time relative to the period during which the associated bell 45 or 46 is closed and also relative to the period during which the other receiver is being loaded.

Means may be provided for terminating operation of the apparatus in the event that something goes wrong with a fluid pressure motor 53, 57 or 61. For example, the piston 56 of the motor 57 may be extended upwardly through the end of the cylinder 58 and provided with a knob 67 adapted for actuating a pair of limit switches 68 and 69. Referring particularly to Figure 2, the limit switch 68 is shown in its off position and the limit switch 69 in its on position, the latter being held in such position by the knob 67 which is shown in its lower extreme position. Now referring particularly to Figure 5, the limit switch 69 is shown in its off position and the limit switch 68 in its on position, the latter being held in such position by the knob 67 which is shown in its extreme upper position. So long as one of the switches is in its on position, the source of electric power for the apparatus is uninterrupted. In order to prevent any interruption during normal operation of the apparatus when the knob 67 is in its intermediate position, i. e., when both switches are off, time delay relays (not shown) which are connected in electric circuit with the switches are operative to keep the power on until the knob has had time to disengage itself from one switch and to engage the other. In the event that the motor is not operating properly and the knob 67 does not disengage itself from one switch and engage the other within the time allowed, the power is interrupted.

It will be understood, of course, that the apparatus hereinabove shown and described is susceptible of various changes and modifications which may be made from time to time without any departure from the general principles or real spirit of the invention. For example, the receiver means may be in the form of two separate structures as shown and described or in the form of one structure divided into a pair of sections by a suitable wall. Accordingly, it is intended to claim the present invention broadly, as well as specifically, as indicated in the appended claims.

What is claimed as new and useful is:

1. In apparatus of the character described, a solid materials collector having a pair of elongated discharge passages, said material being initially entrained in a fluid from which it is centrifugally separated in the collector for gravity discharge therefrom through said passages, a pair of receivers for the material discharged from said collector through said passages, a pair of discharge gates for hermetically sealing discharge openings formed respectively in said receivers and operable for discharge of the material under the influence of gravity from said receivers, valve means including flow control means at the entrance ends of said passages operable for selectively diverting the flow of material from either of the passages aforesaid to the other, and means at the discharge ends of said passages operable for hermetically sealing said collector from said receivers, means operable for equalizing the pressures in said receivers and collector or selectively between said receivers and atmosphere, and means for automatically operating said discharge gates and valve and pressure equalizing means in accordance with a predetermined sequence and time cycle for hermetically sealing said collector constantly from atmosphere so as to permit continuous operation of and discharge from said collector and intermittent discharge alternately from said receivers.

2. In apparatus as defined in claim 1 wherein the flow control means at the entrance ends of the pair of elongated discharge passages operates to direct the flow of material alternately into said passages, and the hermetic sealing means at the discharge ends of said passages operate in such timed relation to one another and the flow control means that material directed into either of said passages flows unobstructed through the passage and into the associated receiver, whereby the receivers are alternately loaded continuously and unloaded intermittently, each while the other is being loaded.

3. In apparatus as defined in claim 1 wherein the flow control means at the entrance ends of the pair of elongated discharge passages operates to direct the flow of material alternately into said passages, and the hermetic sealing means at the discharge ends of said passages operate in such timed relation to one another and the flow control means that when the flow is diverted from either of said passages to the other, the discharge end of the passage from which the flow has been diverted is hermetically sealed after a time delay.

4. In apparatus as defined in claim 1 wherein the flow control means at the entrance ends of the pair of elongated discharge passages operates to direct the flow of material alternately into said passages, and the hermetic sealing means at the discharge ends of said passages operate in such timed relation to one another and the flow control means that while the flow is being diverted from either of said passages to the other, the discharge ends of said passages are open for the discharge of material therethrough.

5. In apparatus as defined in claim 1 wherein the pressure equalizing means operates in such timed relation to the hermetic sealing means at the discharge ends of the elongated passages that the pressure between either receiver and atmosphere is equalized only while the discharge end of the associated one of the passages aforesaid is sealed.

References Cited in the file of this patent

UNITED STATES PATENTS

| 1,440,033 | Stevens et al. | Dec. 26, 1922 |
| 1,781,352 | Tolman et al. | Nov. 11, 1930 |
| 1,908,181 | Prouty | May 9, 1933 |
| 1,995,651 | Rathbun | Mar. 26, 1935 |
| 2,393,766 | Gordon | Jan. 29, 1946 |

FOREIGN PATENTS

| 685,339 | Germany | May 23, 1940 |